No. 876,607. PATENTED JAN. 14, 1908.
O. N. TEVANDER.
BELT COUPLING.
APPLICATION FILED AUG. 20, 1906.

Witnesses:

Inventor:
Olof N. Tevander

UNITED STATES PATENT OFFICE.

OLOF N. TEVANDER, OF CHICAGO, ILLINOIS, ASSIGNOR, BY MESNE ASSIGNMENTS, TO FLEXIBLE STEEL LACING COMPANY, A CORPORATION.

BELT-COUPLING.

No. 876,607.

Specification of Letters Patent.

Patented Jan. 14, 1908.

Application filed August 20, 1906. Serial No. 331,406.

*To all whom it may concern:*

Be it known that I, OLOF N. TEVANDER, a citizen of Chicago, county of Cook, and State of Illinois, have invented a certain new, useful, and Improved Belt-Coupling, of which the following is a full, clear, and exact description, such as will enable others skilled in the art to which it appertains to make and use the same.

My invention relates to improvements in hinge-couplings or lacings for driving-belts and has particular reference to improvements in metal couplings or lacings of that class in which the couplings are entirely composed of, or made from, sheet metal.

The object of my invention is to provide an improved metallic lacing for driving belts and the particular object of the invention is to provide an improved metallic lacing which shall be composed of pivotally joined or united members or parts, to the end that the lacing shall be freed from the strains which detrimentally affect single metallic lacings.

Other objects of my invention will appear hereinafter.

My invention consists in a metallic belt lacing, or coupling, of the construction and combination of parts hereinafter described and particularly pointed out in the claims.

Figure 1:
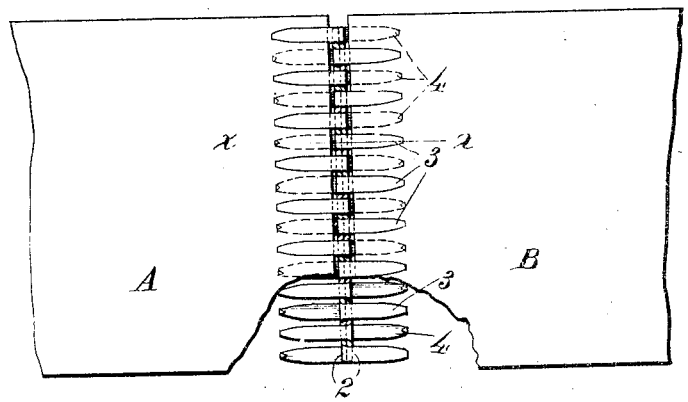
Figure 3:
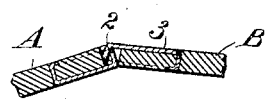
Figure 2:
Figure 4:
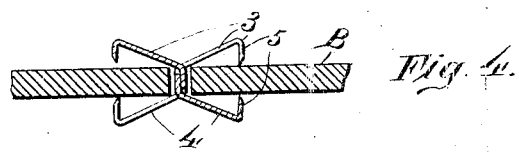
Figure 5:
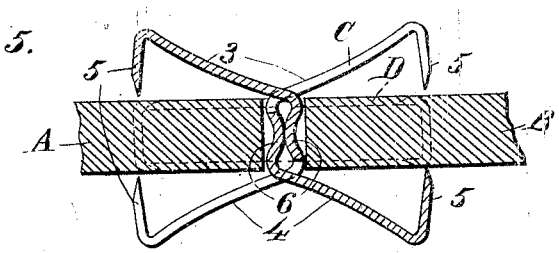
Figure 6:
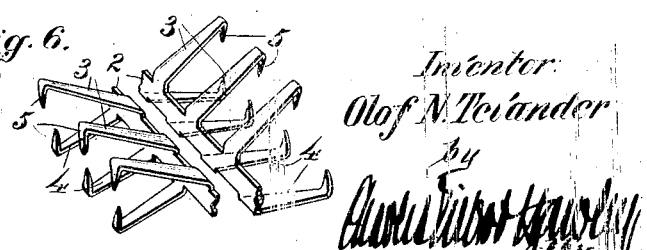

My invention will be more readily understood by reference to the accompanying drawings forming a part of this specification, and in which;

Figure 1 represents two belt ends joined by a metallic lacing or coupling embodying my invention; Fig. 2 is a sectional view thereof on the line X—X of Fig. 1; Fig. 3 is a similar view illustrating the pivotal action of the two members which compose the lacing or coupling; Fig. 4 illustrates the initial condition or commercial form of my improved coupling; and also the method of applying the same to the belt ends; Fig. 5 is a sectional view illustrating a coupling of greater size than that shown in the preceding figures; disclosing pivot bar portions of a modified form, which I find advantageous in couplings of the larger sizes; and Fig. 6 is a perspective view showing the two members of the coupling as they appear before they are interlocked; the purpose of this drawing being to show how the prongs of one member are staggered or offset with relation to those of the other member.

My improved coupling is preferably made from sheet metal, the members of the couplings being stamped from such material and then formed into the bent or U shape in which form they are most readily applicable to the ends of belts. Each member of my coupling comprises in itself, a complete article of commerce or manufacture; and, the complete coupling is, so to speak, made from such single piece or member; that is to say, a single member of suitable length is separated into two parts, and these parts, being interlocked, form the complete pivotal or hinge coupling. Thus, I prefer to make my coupling members in long strips or lengths, which are afterward cut into shorter lengths to form couplings of commercial sizes. These long strips may be furnished to users in strip form, to the end that they may take therefrom sections of special lengths to fit belts of odd widths. It is my practice to make these couplings rust proof, by tinning, or otherwise plating the members of the coupling as soon as they have been stamped and formed.

In the several figures of the drawings, only the terminal portions or connected ends of a belt are shown and these are indicated by the reference characters A and B.

As shown in the drawings each coupler member comprises a pivot bar portion, 2, together with two jaws, the latter comprising two sets of prongs, 3 and 4, projecting from opposite edges of the bar portion and having pointed ends, 5, which are turned inwardly, to be driven into or through the belt. The length of the sharp ends, 5, is greater than the width of the pivot-bar portion, 2, of the coupler, and greater also than the thickness of the belt, to the end that they may be clenched in the belt. The pivot bar portion, 2, is substantially straight, and as it corresponds to the end of the belt, its width substantially equals the thickness of the belt. It may be considerably narrower, but should not be of greater width or thickness than the belt to which the coupling is to be applied. Such are the requirements of my best shop practice, although it will be understood that misproportioned couplings are sometimes applied to belts, as when couplings of proper dimensions are not at hand. It will be noted that the prongs are widely separated, the space between each two prongs being sufficient to admit a prong of the co-acting member. I prefer that the two rows or sets of prongs on each member of the coupling shall be relatively staggered, to the end that their sharp ends shall not interfere when driven into the belt, and also for the purpose of distributing the points of engagement with the belt. These, however, are not the only reasons for constructing the device in this form, forasmuch as a further purpose is to distribute the pulling strain upon the pivot bar portions of the members in the best possible manner.

It will be observed that when the two members are interlocked, the prong of one member rises, or descends, between those prongs of the other member which are on the same side of the coupling (i. e. on the same side of the belt). Passing between these, the inner end of the prong, which inner end constitutes part of the bar portion of its member, meets the like inner end of a complementary prong of the other member, which last is in direct line therewith but on the opposite side of the coupling. In this manner the individual prongs belonging to the interlocked members may be said to be hooked together in pairs, from opposite sides of the coupling and on the pivotal line thereof. The effect of this arrangement is to directly couple every prong of one member with an opposed or complementary prong on the other member, hence practically all portions of the bars 2, may be regarded as portions of the prongs and such parts of the bar portions as are intermediate, in effect, serve only as prong-connecting parts, and are therefore but slightly affected by the strain of the belt.

For sake of comparison it may be stated that in making my coupling members I may place the integrally joined prongs directly opposite each other on the pivot bar portion of the member. Members of this form may be more easily placed together than those members which have relatively staggered prongs, but in such case the entire strain of the belt must be sustained by the intermediate parts of the pivot bar portions, and under excessive strains such portions would be apt to be bent, and thereby, their effectiveness, lessened. Nevertheless, I intend that the structure last defined shall be included within the scope of my invention, and in this connection desire to state, that I do not confine my invention to specific constructions, except as defined by the appended claims, for the reason that various modifications in the form and arrangement of the prongs and interconnecting bars or parts will readily suggest themselves to any one skilled in the art.

As will now be clearly understood, the cross bar portion, 2, of each member of my coupling serves as the pivot for the other member of the coupling. In other words, the members are reciprocally, or self, interlocked, and the inner sides of the bar portions engage in such manner that each serves as the pivot bar or pin for the other, as is well shown in the drawings. In the smaller sizes of my device the pivot bar portions, though flat, are so narrow that they readily rock upon one another without materially increasing the overall width of the coupling on the outer side of the belt and without subjecting the coupling itself to varying or unequal strains which are appreciable. But, in the larger sizes of my coupling, such as are employed for joining the ends of very thick belts, I find that it is advantageous to provide the pivot bar portions, 2, of the coupling, with longitudinal pivot beads or ribs, 6, as illustrated in Fig. 5. The beads of the interlocked members are relatively convex, as shown, and the bead of each member provides a pivotal rocking surface for the other; whereby the pivotal line of the coupling is established and maintained, substantially, at the neutral plane of the belt. The ribs, 6, also serve to strengthen the pivot bar portions on which they are formed. In these larger couplings, I also prefer that the prongs shall be initially bent as shown at c in Fig. 5, to insure the burying of the prongs in the sides of the belt when the sharp ends are clenched therein. (See full and dotted lines C and D respectively of Fig. 5).

The two parts or members of my improved belt coupling may each be regarded as a series of integrally joined staples, the two members being linked or interlocked to hinge, each upon the other, and the ends of the staples being turned and driven into, or clenched in, the belt ends, to connect the latter.

Having thus described my invention, I claim as new and desire to secure by Letters Patent:—

1. An improved article of manufacture, comprising a metallic belt coupling member composed of a pivot bar portion adapted to serve as the pivot of a like member and two sets of integral prongs projecting therefrom, adapted to be clenched upon the end of a belt, substantially as described.

2. An improved article of manufacture, comprising a metallic belt coupling member composed of a pivot bar portion adapted to serve as the pivot of a like member and two relatively staggered sets of integral prongs projecting therefrom, adapted to be clenched upon the end of belt, substantially as described.

3. An improved hinge-like metallic belt lacing or coupling, comprising two interlocked members or parts, each serving as the pivot for the other and each provided with belt engaging jaws, substantially as described.

4. An improved hinge-like metallic belt lacing or coupling, comprising two self-interlocked members or parts, each serving as the pivot for the other and each provided with belt engaging jaws composed of a plurality of clenchable prongs, substantially as described.

5. An improved hinge-like metallic belt lacing or coupling, comprising two self-interlocked members or parts, each serving as the pivot for the other and each provided with belt engaging jaws, composed of two relatively staggered sets of clenchable prongs, substantially as described.

6. An improved hinge-like metallic belt lacing or coupling, comprising two self-interlocked members, each composed of a pivot bar portion and a plurality of integral clenching prongs projecting therefrom, substantially as described.

7. An improved hinge-like metallic belt lacing or coupling, comprising two self-interlocked members, each composed of a longitudinally ribbed pivot bar portion and a plurality of integral clenching prongs projecting therefrom, substantially as described.

8. An improved hinge-like metallic belt lacing or coupling, comprising two self-interlocked members, each composed of a pivot bar portion, having a convex inner surface, and a plurality of integral clenching prongs projecting therefrom, the convex surfaces of said pivot bar portions being engaged, substantially as and for the purpose specified.

9. In a hinge-like metallic belt lacing or coupling, two interlocked parts or members composed of sheet metal and each comprising a pivot bar portion and two relatively staggered sets of integral clenching prongs, said pivot bar portions being engaged each with the other, substantially as described.

10. An improved hinge-like metallic belt lacing or coupling member, comprising a pivot bar portion and two relatively staggered sets of integral prongs projecting therefrom, the ends of said prongs being bent inwardly and the length of such ends exceeding the width of said bar portion, substantially as described.

11. An improved hinge-like metallic belt lacing or coupling, comprising two self-interlocked members, each composed of a pivot bar portion, adapted to serve as the pivot for the other member, together with two divergent sets of integral curved prongs projecting from said pivot bar portion and having inwardly turned clenchable ends, substantially as described.

12. An improved hinge-like metallic belt lacing or coupling, comprising two self-interlocked members, each composed of a pivot bar portion, adapted to serve as the pivot for the other member, together with two relatively divergent and staggered sets of integral curved prongs having inwardly turned clenchable ends, substantially as described.

In testimony whereof, I have hereunto set my hand, this 4th day of August, 1906, in the presence of two subscribing witnesses.

OLOF N. TEVANDER.

Witnesses:
CHARLES GILBERT HAWLEY,
M. SIMON.